(12) United States Patent
Parcell (10) Patent No.: US 8,182,212 B2
(45) Date of Patent: May 22, 2012

(54) PUMP HOUSING COUPLING

(75) Inventor: Jason W. Parcell, Winston-Salem, NC (US)

(73) Assignee: Hayward Industries, Inc., Elizabeth, NJ (US)

(*) Notice: Subject to any disclaimer, the term of this patent is extended or adjusted under 35 U.S.C. 154(b) by 1048 days.

(21) Appl. No.: 11/904,426

(22) Filed: Sep. 27, 2007

(65) Prior Publication Data

US 2008/0079259 A1 Apr. 3, 2008

Related U.S. Application Data

(60) Provisional application No. 60/848,074, filed on Sep. 29, 2006.

(51) Int. Cl.
*F16L 23/24* (2006.01)
*F04D 29/60* (2006.01)
*F04D 29/62* (2006.01)

(52) U.S. Cl. ................... 415/200; 415/213.1
(58) Field of Classification Search .......... 415/200, 415/213.1, 214.1
See application file for complete search history.

(56) References Cited

U.S. PATENT DOCUMENTS

| | | | |
|---|---|---|---|
| D131,875 S | 3/1942 | Houston | |
| 2,632,355 A | 3/1953 | Becker | |
| 3,403,718 A | 10/1968 | Hughes | |
| 3,456,549 A | 7/1969 | Horton | |
| 3,468,260 A | 9/1969 | Belden | |
| 3,557,857 A | 1/1971 | Swenson | |
| 3,744,635 A | 7/1973 | Horvath | |
| 3,826,589 A | 7/1974 | Frank et al. | |
| 3,966,363 A * | 6/1976 | Rowley et al. | 417/423.11 |
| 4,182,216 A | 1/1980 | DeCaro | |
| D255,480 S | 6/1980 | Zieg | |
| 4,242,064 A | 12/1980 | Uncles | |
| 4,269,557 A | 5/1981 | Kidd | |
| 4,287,067 A | 9/1981 | Dyner | |
| 4,353,846 A | 10/1982 | Mehrens et al. | |
| 4,377,360 A | 3/1983 | Kennedy | |

(Continued)

FOREIGN PATENT DOCUMENTS

EP 0499506 8/1992

(Continued)

OTHER PUBLICATIONS

Hayward Buyer's Guide and Parts Price List, effective Dec. 29, 2003 (4 pages).

(Continued)

*Primary Examiner* — Edward Look
*Assistant Examiner* — Jesse Prager
(74) *Attorney, Agent, or Firm* — McCarter & English, LLP (57) ABSTRACT

An assembly is disclosed for forming a fluid-tight seal between a pump housing and a seal plate. The housing includes a first flange with a first plurality of apertures formed therein, and the seal plate includes a second flange with a second plurality of apertures formed therein. A gasket is provided between the pump housing and the seal plate. A plurality of inserts extend through the first plurality of apertures, and a plurality of spacers extend through the second plurality of apertures. A plurality of threaded connectors are used to couple the seal plate to the pump housing to form a fluid-tight seal. The dimensions of the inserts and spacers are selected so as to inhibit crushing of the gasket and the flanges when the connectors are fully tightened.

20 Claims, 6 Drawing Sheets

U.S. PATENT DOCUMENTS

| | | | |
|---|---|---|---|
| 4,473,470 A | 9/1984 | Loutit | |
| 4,629,557 A | 12/1986 | Tobias | |
| 4,773,823 A | 9/1988 | Pease | |
| 4,783,260 A | 11/1988 | Kurihara | |
| D299,143 S | 12/1988 | Hazlehurst | |
| 4,871,303 A | 10/1989 | Roesler | |
| 4,898,513 A | 2/1990 | Hon | |
| 4,901,926 A | 2/1990 | Klotzbach | |
| 4,934,886 A | 6/1990 | Aikens | |
| 4,967,463 A | 11/1990 | Pratt | |
| 5,012,535 A | 5/1991 | Klotzbach | |
| 5,066,179 A | 11/1991 | Pratt | |
| 5,156,535 A | 10/1992 | Budris et al. | |
| 5,167,041 A | 12/1992 | Burkitt, III | |
| 5,199,836 A | 4/1993 | Goarty | |
| 5,409,606 A | 4/1995 | Spencer | |
| 5,624,559 A | 4/1997 | Levin et al. | |
| 5,742,954 A | 4/1998 | Idland | |
| 5,858,234 A | 1/1999 | Sukun | |
| 5,897,787 A | 4/1999 | Keller | |
| 5,983,416 A | 11/1999 | Idland | |
| D419,567 S | 1/2000 | Weiss | |
| 6,041,453 A | 3/2000 | Barrow et al. | |
| D425,911 S | 5/2000 | Fleischer et al. | |
| 6,149,407 A | 11/2000 | Laing | |
| 6,187,179 B1 | 2/2001 | Mayer et al. | |
| 6,287,466 B1 | 9/2001 | Yassin | |
| D450,106 S | 11/2001 | Herr | |
| D450,327 S | 11/2001 | Mori et al. | |
| 6,379,127 B1 | 4/2002 | Andrews et al. | |
| D466,522 S | 12/2002 | Huang | |
| 6,554,587 B2 | 4/2003 | Paolini et al. | |
| 6,623,245 B2 | 9/2003 | Meza et al. | |
| 6,659,717 B1 | 12/2003 | Kao | |
| 6,716,348 B1 | 4/2004 | Morgan | |
| 6,824,354 B2 | 11/2004 | Laing | |
| D507,579 S | 7/2005 | Rossman et al. | |
| 6,939,463 B2 | 9/2005 | Leaverton | |
| 6,955,637 B1 | 10/2005 | Montano et al. | |
| 6,974,303 B2 | 12/2005 | Wang | |
| 7,001,159 B2 | 2/2006 | Peterson, Jr. et al. | |
| D517,570 S | 3/2006 | Stiles, Jr. et al. | |
| 7,063,791 B2 | 6/2006 | Miner | |
| D536,705 S | 2/2007 | Griffin et al. | |
| 7,188,378 B2 | 3/2007 | Ryan | |
| 7,203,977 B2 | 4/2007 | Mattson, Jr. et al. | |
| 7,223,337 B1 | 5/2007 | Franzino et al. | |
| D550,805 S | 9/2007 | Hazlehurst | |
| D551,256 S | 9/2007 | Pecca et al. | |
| D557,374 S | 12/2007 | Pecca | |
| 7,316,423 B2 | 1/2008 | Rochelle | |
| 7,334,743 B2 | 2/2008 | Wintering et al. | |
| D568,340 S | 5/2008 | Stiles, Jr. et al. | |
| 7,424,753 B2 | 9/2008 | Gruenwald | |
| 7,454,802 B2 | 11/2008 | Tennant et al. | |
| 7,540,721 B2 | 6/2009 | Liedtke et al. | |
| 7,665,158 B2 | 2/2010 | Castellote | |
| 7,686,587 B2 | 3/2010 | Koehl | |
| 7,686,589 B2 | 3/2010 | Stiles, Jr. et al. | |
| 2001/0021613 A1 | 9/2001 | Fadeley et al. | |
| 2003/0017055 A1 | 1/2003 | Fong | |
| 2004/0009075 A1 | 1/2004 | Meza et al. | |
| 2004/0022599 A1 | 2/2004 | Nagayama | |
| 2004/0091373 A1 | 5/2004 | Terry et al. | |
| 2004/0247411 A1 | 12/2004 | Nagayama | |
| 2005/0019154 A1 | 1/2005 | Dial | |
| 2005/0084401 A1 | 4/2005 | Coray et al. | |
| 2005/0095150 A1 | 5/2005 | Leone et al. | |
| 2005/0100455 A1 | 5/2005 | Tuddenham | |
| 2005/0118039 A1 | 6/2005 | Shorten et al. | |
| 2005/0158194 A1 | 7/2005 | Sloan et al. | |
| 2006/0088423 A1 | 4/2006 | Brunet et al. | |
| 2007/0114162 A1 | 5/2007 | Stiles et al. | |
| 2007/0114168 A1 | 5/2007 | Hazlehurst | |
| 2007/0154319 A1 | 7/2007 | Stiles, Jr. et al. | |
| 2007/0154320 A1 | 7/2007 | Stiles, Jr. et al. | |
| 2007/0154321 A1 | 7/2007 | Stiles, Jr. et al. | |
| 2007/0154322 A1 | 7/2007 | Stiles, Jr. et al. | |
| 2007/0154323 A1 | 7/2007 | Stiles, Jr. et al. | |
| 2007/0163929 A1 | 7/2007 | Stiles, Jr. et al. | |
| 2007/0183902 A1 | 8/2007 | Stiles, Jr. et al. | |
| 2008/0134425 A1 | 6/2008 | Tatum | |
| 2009/0252616 A1 | 10/2009 | Brunet et al. | |
| 2009/0311115 A1 | 12/2009 | Ono et al. | |
| 2010/0006158 A1 | 1/2010 | Castellote et al. | |
| 2010/0049228 A1 | 2/2010 | Kuehner et al. | |
| 2010/0146696 A1 | 6/2010 | Campbell et al. | |
| 2010/0183452 A1 | 7/2010 | Bosua | |
| 2010/0247332 A1 | 9/2010 | Stiles, Jr. et al. | |
| 2010/0254825 A1 | 10/2010 | Stiles, Jr. et al. | |
| 2011/0076156 A1 | 3/2011 | Stiles, Jr. et al. | |

FOREIGN PATENT DOCUMENTS

| | | |
|---|---|---|
| EP | 0601899 | 6/1994 |
| EP | 0657602 | 6/1995 |
| EP | 0674109 A1 | 9/1995 |
| EP | 0971137 A1 | 1/2000 |
| EP | 1267085 | 12/2002 |
| EP | 1262670 B1 | 9/2005 |
| FR | 2672646 | 8/1992 |
| GB | 1590253 | 5/1981 |
| GB | 2199106 A | 6/1988 |
| GB | 2352789 A | 2/2001 |
| GB | 2361041 | 10/2001 |
| JP | 6-341398 | 12/1994 |
| JP | 2000-220622 | 8/2000 |
| JP | 2000-220623 | 8/2000 |
| WO | WO 94/10466 | 5/1994 |
| WO | WO 00/68575 | 11/2000 |

OTHER PUBLICATIONS

Notice of Allowance dated Aug. 4, 2008, from pending U.S. Appl. No. 11/541,924 (9 pages).

U.S. Appl. No. 29/267,940, Title: Pump Housing, Filed: Oct. 25, 2006, Inventors: Griffin, et al.

Sta-Rite® Owner's Manual for the Max-E-Glass II™ and Dura-Glass II™ Centrifugal Pumps with Integral Trap (2003).

Sta-Rite® Basket C8-58P (2003) (Perspective and Six Orthogonal View Photographs).

Pages from various Internet sources printed on Oct. 25, 2005.

Textron, Inc., Various Textron Bushings, Printouts from http://www.avdel.textron.com (at least as early as Jan. 2006).

Office Action mailed Nov. 10, 2010 from pending U.S. Appl. No. 12/270,349, filed Nov. 13, 2008 (9 pages).

\* cited by examiner

PUMP HOUSING COUPLING

CROSS-REFERENCE TO RELATED APPLICATIONS

The present application claims the benefit under 35 U.S.C. § 119(e) of U.S. Provisional Application No. 60/848,074, filed Sep. 29, 2006, which is hereby incorporated by reference in its entirety for all purposes.

FIELD OF THE INVENTION

The present invention relates to pumps, and more particularly, to pumps with fluid-sealing couplings.

BACKGROUND OF THE INVENTION

Water pumps incorporate fluid-sealing couplings adapted to retain fluid under pressure during operation of the equipment. Such couplings are also often designed to facilitate disassembly and reassembly of the equipment (e.g., to inspect and replace internal equipment components when the equipment is not in operation). Properly assembled couplings apply a predetermined level of compression on a sealing element (e.g., a gasket) to prevent fluid from leaking out of the coupling.

In order to disassemble and properly reassemble conventional pumps, it is frequently necessary to use instructions and/or special tools. In instances where instructions and/or special tools are not provided, or where instructions and/or special tools are provided but not available, the coupling may be reassembled with improper alignment. For example, the application of insufficient torque on one or more coupling bolts, relative to a predetermined level, may result in fluid leakage at the gasket adjacent to any under-tightened bolt. Likewise, the application of too much torque on one or more housing bolts, relative to a predetermined level, may result in damage to the seal of the coupling (e.g, a crushed or crimped gasket).

SUMMARY OF THE INVENTION

The present invention provides a fluid-sealing coupling that can be dissembled and subsequently completely reassembled, readily and reliably in proper alignment, without the use of specialized tools or instructions. The fluid-sealing coupling includes first and second ends, each having at least one sealing surface positioned thereon. The coupling also includes a seal, such as a gasket, which is interposed between the sealing surfaces of the first and second ends so as to retain fluids within the coupling. More particularly, a plurality of inserts, each having an alignment surface formed thereon, are positioned in a plurality of recesses located on the first end. Likewise a plurality of spacers, each having an alignment surface formed thereon, are positioned in a plurality of recesses which are located on the second end. When connectors, such as bolts, position the respective alignment surfaces of the inserts and spacers such that they are in contact with each other, the coupling is properly assembled.

The present invention is therefore particularly useful for users who are inexperienced in the disassembly and assembly of fluid-sealing couplings. The features and advantages of the invention will appear more clearly on a reading of the detailed description of the exemplary embodiments of the invention, which is given below by way of example only and with reference to the accompanying drawings.

BRIEF DESCRIPTION OF THE DRAWINGS

For a better understanding of the present invention, reference is made to the following detailed description of an exemplary embodiment considered in conjunction with the accompanying drawings, in which.

DETAILED DESCRIPTION OF THE INVENTION

Figure 1:
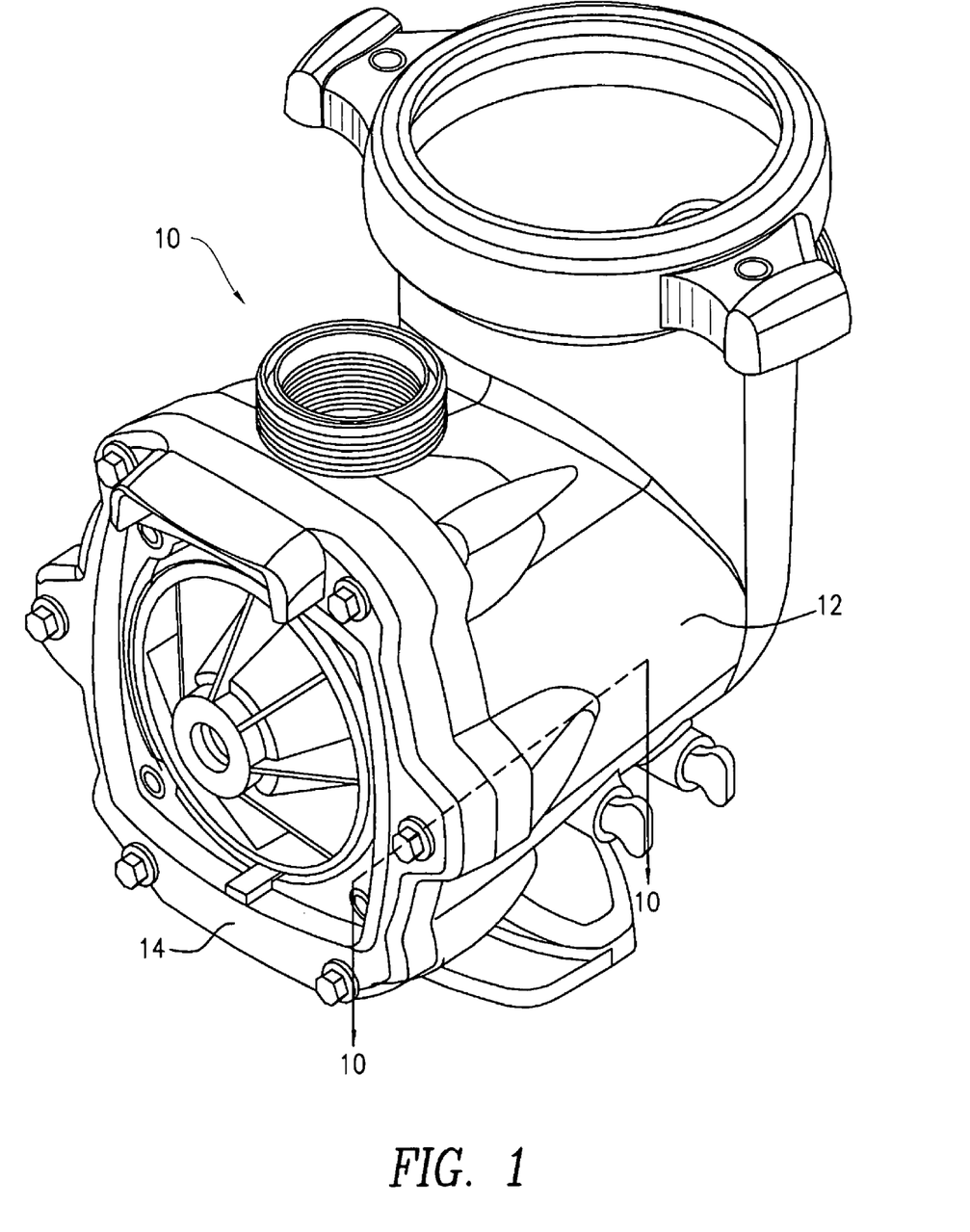
FIG. 1 is a perspective view of a pump constructed in accordance with an exemplary embodiment of a pump housing coupling of the present invention.
Figure 2:
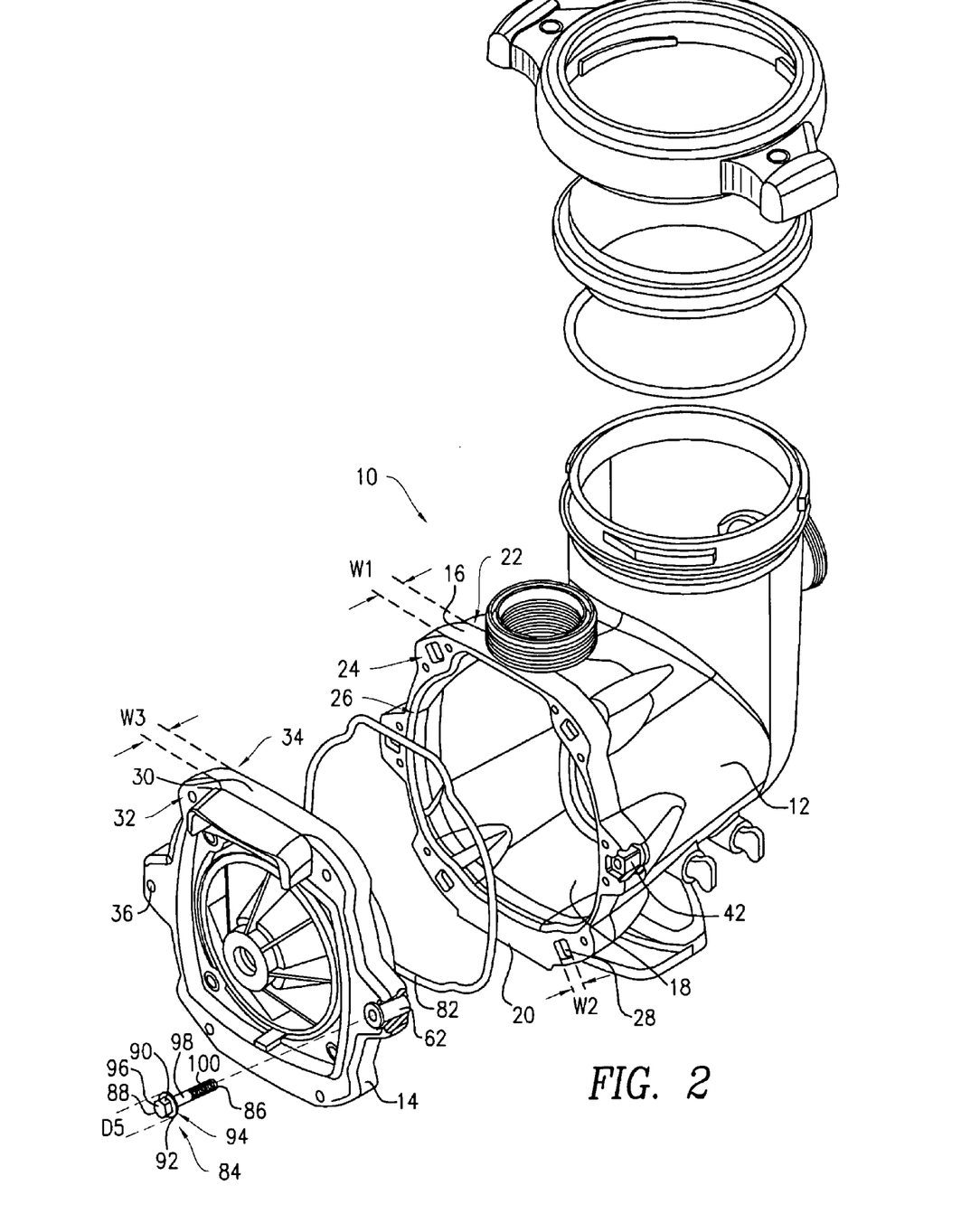
FIG. 2 is an exploded perspective view of the pump shown in FIG. 1, portions of the pump being broken away to facilitate discussion of the pump housing coupling of the present invention.
Figure 3:
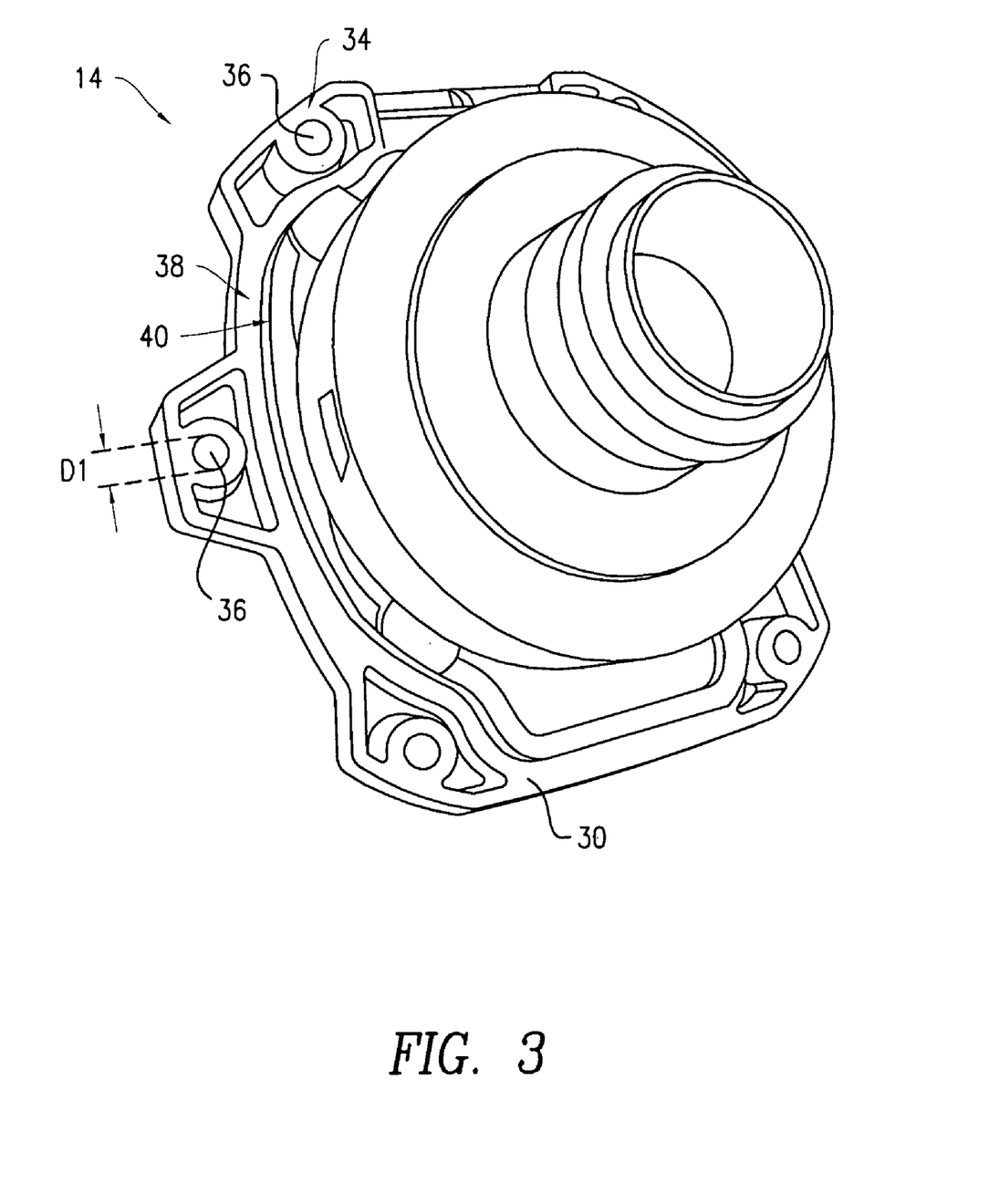
FIG. 3 is a rear perspective view of a seal plate employed by the pump shown in FIGS. 1 and 2.

Referring to FIGS. 1-3, a pump 10 includes a pump housing 12 and a seal plate 14, which is removably attached to the pump housing 12. The pump housing 12 and the seal plate 14 are preferably constructed from glass fiber polypropylene, although other suitable materials may be utilized. An electric motor (not shown) is removably attached to the seal plate 14 and coupled to an impeller (not shown) within the pump housing 12. The pump 10 circulates fluid in a fluid circulating system. For example, the pump 10 circulates water in a swimming pool, spa, or whirlpool.

With particular reference to FIG. 2, the pump housing 12 includes a flange 16 formed about an opening 18 at a first end 20 of the pump housing 12. The flange 16 includes a first surface 22 and an opposing second surface 24, which is adjacent the seal plate 14 when the seal plate 14 is attached to the pump housing 12. The flange 16 has a width W1 between the first surface 22 and the second surface 24. A sealing surface 26 is formed along the inner periphery of the second surface 24. The sealing surface 26 is oriented at an angle (e.g., 45 degrees) relative to the second surface 24 of the pump housing 12. The flange 16 includes a plurality of square-shaped apertures 28, each having a width W2.

Referring to FIGS. 2-3, the seal plate 14 includes a flange 30 having a first surface 32 and an opposing second surface 34, which is adjacent the pump housing 12 when the seal plate 14 is attached to the pump housing 12. The flange 30 has a width W3 between the first surface 32 and the second surface 34. The flange 30 includes a plurality of circle-shaped apertures 36, each having a diameter D1. The circle-shaped apertures 36 of the flange 30 are adjacent the square-shaped apertures 28 of the flange 16, when the seal plate 14 is attached to the pump housing 12.

With particular reference to FIG. 3, the seal plate 14 includes a first sealing surface 38 that is disposed about the inner periphery of the second surface 34. The seal plate 14 further includes a second sealing surface 40 that is substantially perpendicular to the first sealing surface 38.

Figure 4:
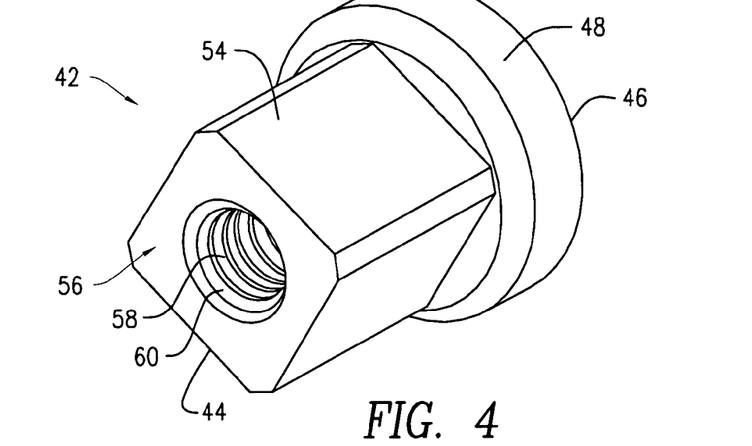
FIG. 4 is a perspective view of an insert.
Figure 5:
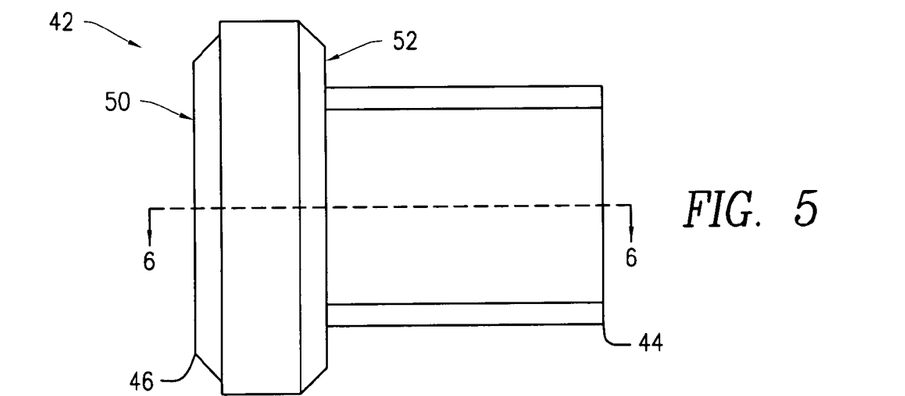
FIG. 5 is a side elevational view of the insert shown in FIG. 4.
Figure 6:
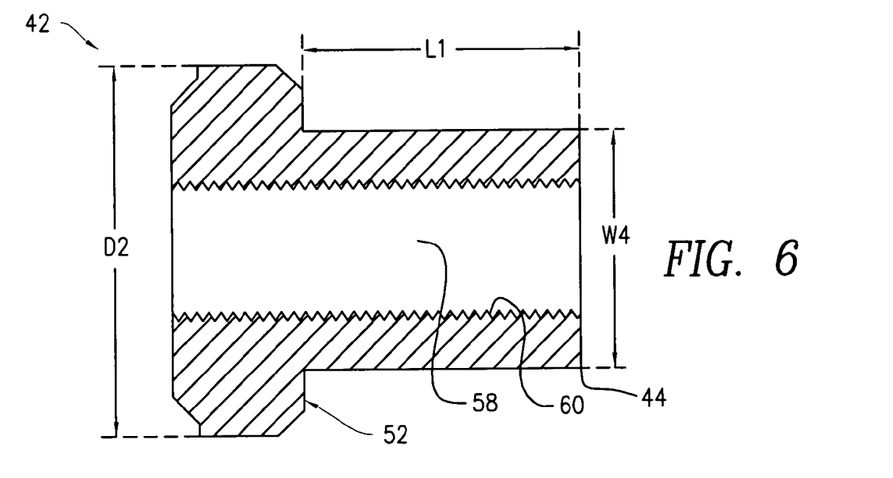
FIG. 6 is a is a cross-sectional view, taken along section line 6-6 of FIG. 5, of the insert shown in FIG. 5.

Referring now to FIGS. 4-6, an insert 42 has a first end 44 and an opposing second end 46. The insert 42 is formed from sintered bronze, although other suitable materials may be used. The insert 42 includes a circle-shaped head 48 having a first surface 50, which is formed at the second end 46 of the insert 42, and an opposing second surface 52. The circle-shaped head 48 has diameter D2, which is larger than the width W2 of the square-shaped apertures 28 of the flange 16.

The insert 42 further includes a square-shaped shank 54 that extends from the second surface 52 of the circle-shaped head 48 to the first end 44 of the insert 42. The square-shaped shank 54 includes an alignment surface 56 formed at the first end 44 of the insert 42. A boring 58 is formed within the insert 42. The boring 58 extends from the first end 44 through the square-shaped shank 54 and the circle-shaped head 48 to the second end 46 of the insert 42. The boring 58 has threads 60 formed therein.

The square-shaped shank 54 has a length L1 as measured from the second surface 52 of the circle-shaped head 48 to the first end 44 of the insert 42. The length L1 of the square-shaped shank 54 is less than the width W1 of the flange 16. The square-shaped shank 54 has a width W4, which is slightly smaller that the width W2 of the square-shaped apertures 28.

Figure 7:
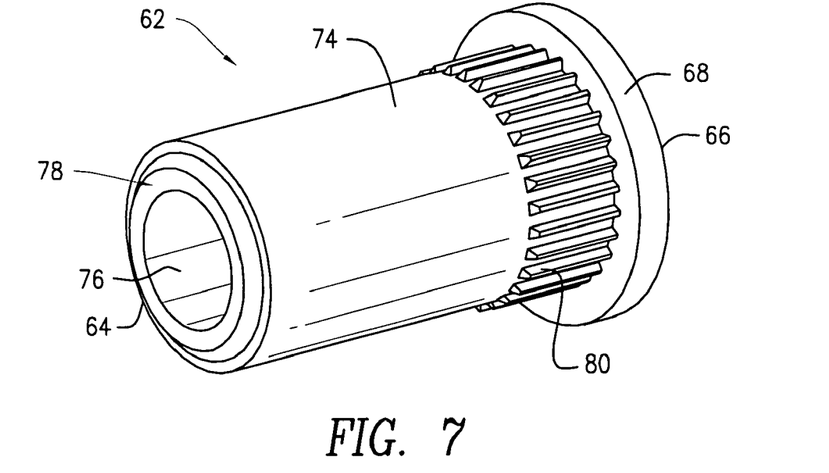
FIG. 7 is a perspective view of a spacer.
Figure 8:
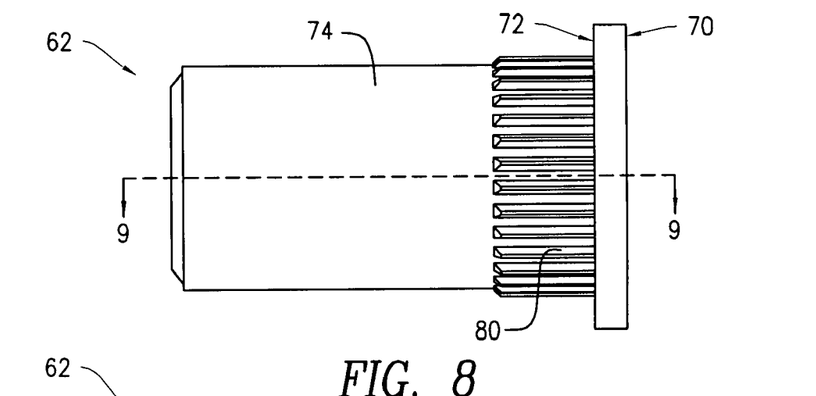
FIG. 8 is a side elevational view of the spacer shown in FIG. 7.
Figure 9:
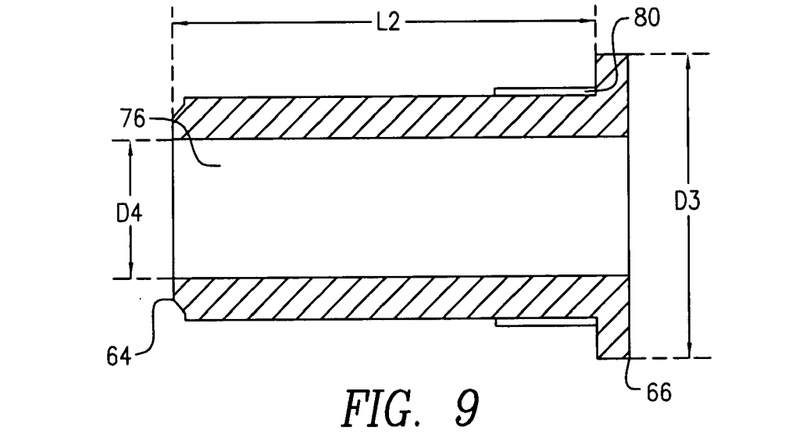
FIG. 9 is a is a cross-sectional view, taken along section line 9-9 of FIG. 8, of the spacer shown in FIG. 8.

Referring now to FIGS. 7-9, a spacer 62 has a first end 64 and an opposing second end 66. The spacer 62 is formed from sintered bronze, although other suitable materials may be used. The spacer 62 includes a circle-shaped head 68 having a first surface 70 and an opposing second surface 72. The first surface 70 of the circle-shaped head 68 is formed at the second end 66 of the spacer 62. The circle-shaped head 68 of the spacer 62 has a diameter D3, which is larger than the diameter D1 of the circle-shaped apertures 36.

The spacer 62 includes a circle-shaped shank 74 that extends from the second surface 72 of the circle-shaped head 68 to the first end 64 of the spacer 62. The spacer 62 further includes a boring 76 that extends from first end 64 through the circle-shaped shank 74 and the circle-shaped head 68 to the second end 66 of the spacer 62. The boring 76 has a diameter D4. The circle-shaped shank 74 includes an alignment surface 78 formed at the first end 64 of the spacer 62.

The circle-shaped shank 74 has a plurality of teeth 80 formed thereon. The circle-shaped shank 74 has a length L2 as measured from the second surface 72 of the circle-shaped head 68 to the first end 64 of the spacer 62. The length L2 of the circle-shaped shank 74 is greater than the width W3 of the flange 30.

Referring to FIG. 2, the pump 10 includes a gasket 82 disposed between the pump housing 12 and the seal plate 14. The gasket 82 is formed from a resilient elastomeric material such as ethylene propylene diene monomer, although other suitable materials may be utilized.

The seal plate 14 is attached to the pump housing 12 with a plurality of connectors 84, each having a first end 86 and an opposing second end 88. Each connector 84 includes a circle-shaped head 90 having a first surface 92 and an opposing second surface 94. The circle-shaped head 90 includes a hexagon-shaped portion 96 formed at the second end 88 of the connector 84 and extending to the first surface 92 of the circle-shaped head 90. The circle-shaped head 90 has a diameter D5, which is larger than the diameter D4 of the borings 76 of the spacers 62.

Each connector 84 further includes a circle-shaped shank 98 that extends from the second surface 94 of the circle-shaped head 90 to the first end 86 of the connector 84. The circle-shaped shank 98 includes a plurality of threads 100 formed thereon. The connectors 84 are formed from stainless steel, although other suitable materials may by used.

Still referring to FIG. 2, a procedure for assembling the pump 10 to form a fluid-tight seal (not shown) between the pump housing 12 and the seal plate 14 will now be described in detail. The gasket 82 is placed on the seal plate 14 so as to contact the first sealing surface 38 and the second sealing surface 40. The structure of the first sealing surface 38 and the second sealing surface 40 holds the gasket 82 in place for the remainder of the assembly procedure.

Referring now to FIGS. 1-9, each of a plurality of the inserts 42 is inserted into one of the plurality of the square-shaped apertures 28 in the flange 16. More particularly, the first ends 44 of the inserts 42 are inserted into the square-shaped apertures 28 in the flange 16 and are advanced until the second surfaces 52 of the circle-shaped heads 48 abut the first surface 22 of the flange 16. As previously noted, the diameter D2 of the circle-shaped heads 48 of the inserts 42 is larger than the width W2 of the square-shaped apertures 28, which prevents the circle-shaped heads 48 from passing through the square-shaped apertures 28.

Similarly, each of a plurality of the spacers 62 is fully inserted into one of the plurality of the circle-shaped apertures 36 in the flange 30. More particularly, the first ends 64 of the spacers 62 are inserted into the circle-shaped apertures 36 and are advanced until the second surfaces 72 of the circle-shaped heads 68 of the spacers 62 abut the first surface 32 of the flange 16.

A force (not shown) of sufficient magnitude is preferably applied to the first surfaces 70 of the circle-shaped heads 68 of the spacers 62 to fully advance the teeth 80 of the circle-shaped shanks 74 into the circle-shaped apertures 36 of the flange 30. The spacers 62 are formed from sintered bronze, which is more rigid than glass fiber polypropylene, from which the seal plate 14 is formed. Thus, the dimensions of the teeth 80 should not be so large as to cause damage to the seal plate 14 as the circle-shaped shanks 74 of the spacers 62 are inserted into the circle-shaped apertures 36 of the flange 30.

When the spacers 62 are fully inserted into the circle-shaped apertures 36, the teeth 80 ensure that spacers 62 become securely attached to the seal plate 14. As a result, the spacers 62 will not fall out of the circle-shaped apertures 36 of the seal plate 14 as the remainder of the assembly procedure is performed. Moreover, the first ends 64 of the spacers 62 protrude from the second surface 34 of the flange 30 (see FIG. 10), when the spacers 62 are fully inserted into the circle-shaped apertures 36. The protruding circle-shaped shanks 74 are substantially perpendicular the second surface 34 of the flange 30.

The seal plate 14 is then positioned near the pump housing 12 and the circle-shaped apertures 36 of the flange 30 are aligned with the square-shaped apertures 28 of the flange 16. After proper alignment, the seal plate 14 is advanced toward the pump housing 12.

The seal plate 14 is then attached to the pump housing 12 with the plurality of connectors 84. The first end 86 of one of the connectors 84 is inserted into a boring 76 of one of the spacers 62 and advanced until the first end 86 contacts the boring 58 of the corresponding insert 42. A technician (not shown) uses a wrench (not shown) to apply a torque (not shown) to the hexagon-shaped portion 96 of the connector 84, thereby rotating the connector 84. The applied torque advances the threads 100 of the connector 84 into the threads 60 of the boring 58 of the square-shaped shank 54. The square-shaped shank 54 is prevented from rotating by the square-shaped aperture 28 of the flange 16; thus, only a single wrench is required to assemble the pump 10. Torque is applied until the technician notices that significantly more torque is required to advance the connector 84. At this point, the connector 84 is fully tightened, as the alignment surface 56 of the square-shaped shank 54 of insert 42 firmly contacts the alignment surface 78 of the circle-shaped shank 74 of the spacer 62 (see FIG. 10). The torque application procedure is then repeated for all remaining connectors 84.

Figure 10:
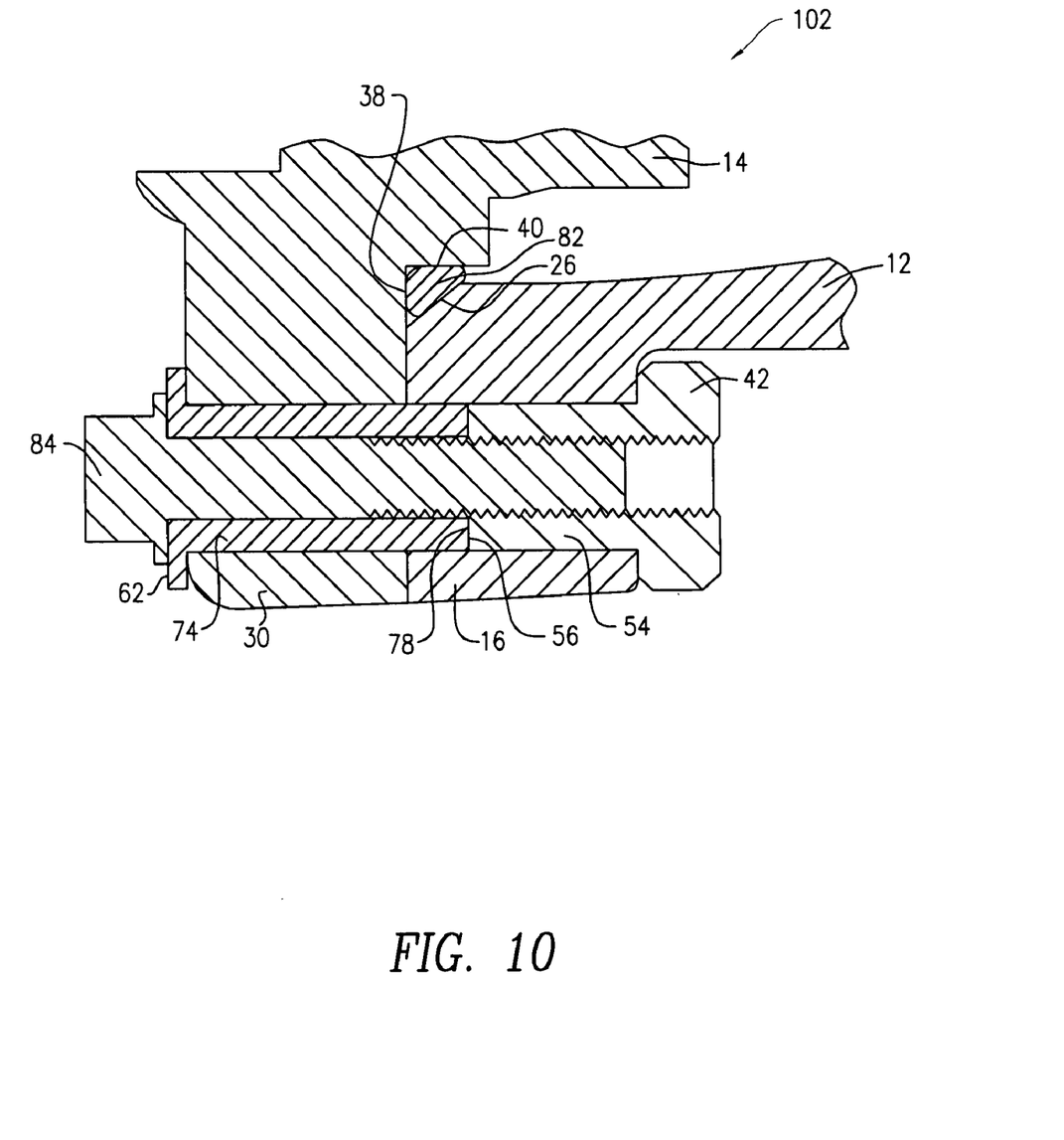
FIG. 10 is a cross-sectional view, taken along section line 10-10 of FIG. 1 and looking in the direction of the arrows, of a portion of the pump shown in FIG. 1.

Referring now to FIG. 10, a pump housing coupling 102 is shown. The seal plate 14 is attached to the pump housing 12 such that a liquid-tight seal (not labeled) is formed by the gasket 82 between the sealing surface 26 of the pump housing 12 and the first and second sealing surfaces 38, 40 of the seal plate 14. The connector 84 has been fully tightened, as described above, ensuring that the alignment surface 78 of the spacer 62 firmly contacts the alignment surface 56 of the insert 42. The circle-shaped shank 74 of the spacer 62 extends into the square-shaped aperture 28 (not labeled) of the flange 16, which makes the pump housing coupling 102 very rigid. For example, if the pump 10 is dropped, damage to the pump housing couplings 102 is less likely to result, because the circle-shaped shanks 74 of the spacers 62 extends into the square-shaped apertures 28 and the alignment surfaces 78 of the spacers 62 firmly contact the alignment surfaces 56 of the inserts 42, which increases the rigidity of the pump housing coupling 102.

The insert 42 and the spacer 62 are formed from sintered bronze, which is more rigid than glass fiber polypropylene, from which the pump housing 12 and seal plate 14 are formed. Thus, the pump housing 12 and seal plate 14 could be damaged by applying too much torque to the connector 84. For example, if the length L1 of the square-shaped shank 54 of the insert 42 is one-half of the width W1 of the flange 16 and the length L2 of the circle-shaped shank 74 of the spacer 62 is one-half of the width W3 of the flange 30, then the alignment surface 56 of the insert 42 would not meet the alignment surface 78 of the spacer 62.

However, the flange 16 and the flange 30 are prevented from being damaged by applying too much torque to the connector 84 by choosing appropriate dimensions for the length L1 of the square-shaped shank 54, the length L2 of the circle-shaped shank 74, the width W1 of the flange 16, and the width W3 of the flange 30. In addition, the angled orientation of the sealing surface 26 of the pump housing 12 helps to prevent the gasket 82 from being crushed between the sealing surface 26 of the pump housing 12 and the sealing surfaces 38, 40 of the seal plate 14.

If the need arises to disassemble the pump 10, e.g., for maintenance, the pump 10 can be disassembled by a procedure that is the reverse of the aforesaid assembly procedure. Following such disassembly, the pump 10 may be reassembled by repeating the aforesaid assembly procedure. There is no need to replace the gasket 82 because of the structure of the pump housing coupling 102 prevents the gasket 82 from being damaged during the assembly procedure.

Some embodiments of the present invention have sealing surfaces 26 that are arranged at orientations other than forty-five degrees relative to the second surface 24 of the flange 16. In some embodiments of the present invention, the gasket 82 is coated with an appropriate lubricant prior to being placed on the seal plate 14.

In some embodiments of the present invention, teeth are formed on the square-shaped shanks 54 of the inserts 42, the length L1 of the square-shaped shanks 54 of the inserts 42 is greater than the width W1 of the flange 16, and the length L2 of the circle-shaped shanks 74 of the spacers 62 is less than the width W1 of the flange 16. In some embodiments of the present invention, the length L1 of the square-shaped shanks 54 of the inserts 42 is slightly less than the width W1 of the flange 16 and the length L2 of the circle-shaped shanks 74 of the spacers 62 is slightly less than the width W3 of the flange 30.

Some embodiments of the present invention include spacers 62 having circle-shaped shanks 74 with structures other than teeth formed thereon, which ensure that the spacers 62 are securely attached to the flange 30, when the spacers 62 are fully inserted into the circle-shaped apertures 36 of the flange 30. In some embodiments of the present invention, the flange 30 includes square-shaped apertures 36 formed therein and the spacers 62 have square-shaped shanks 74. Further, some embodiments of the present invention include connectors 84 having circle-shaped portions 96 with one or more indentations for receiving the tip of a screwdriver.

The present invention may also be adapted to other fluid sealing couplings, such as those employed, for instance, with releasable pipe couplings. It is understood that the embodiments of the present invention described herein are merely exemplary and that a person skilled in the art may make many variations and modifications without departing from the spirit and scope of the invention. All such variations and modifications, including those discussed above, are intended to be included within the scope of the invention as defined in the appended claims.

What is claimed is:

1. A coupling assembly for forming a liquid-tight seal in a water pump, comprising:
    a pump housing defining an opening and including a first flange formed about a periphery of said opening, said first flange including a first surface, an opposing second surface, and a first plurality of apertures formed through said first flange, said pump housing being provided with a first sealing surface disposed at a first angle with respect to an inner periphery of said second surface of said first flange;
    a seal plate including a second flange formed about a periphery thereof, said second flange including a first surface, an opposing second surface, and a second plurality of apertures formed through said second flange, said seal plate being provided with a second sealing surface disposed at a second angle with respect to an inner periphery of said second surface of said second flange;
    a gasket disposed between said first sealing surface, said second sealing surface, and said second surface of said second flange;
    a plurality of inserts each having a threaded boring extending therethrough and each including an insert head portion and an insert shank portion extending from said insert head portion through one of said first plurality of apertures;
    a plurality of spacers each having a boring extending therethrough and each including a spacer head portion and a spacer shank portion extending from said spacer head portion through one of said second plurality of apertures to align said boring with said threaded boring; and
    a plurality of connectors each including a connector head portion abutting said spacer head portion, a connector shank portion extending from said connector head portion, through said boring, and at least partially through said threaded boring, and a plurality of threads formed on said connector shank portion cooperating with said threaded boring to induce a liquid-tight seal between said gasket, said first sealing surface, said second sealing surface, and said second surface of said second flange.

2. The coupling assembly of claim 1, wherein said first angle is about forty-five degrees.

3. The coupling assembly of claim 1, wherein said second angle is about ninety degrees.

4. The coupling assembly of claim 1, wherein each of said first plurality of apertures has a substantially square-shaped cross section, and wherein each insert shank portion has a corresponding substantially square-shaped cross section.

5. The coupling assembly of claim 1, wherein each of said second plurality of apertures has a substantially circle-shaped cross section, and wherein each spacer shank portion has a corresponding substantially circle-shaped cross section.

6. The coupling assembly of claim 1, wherein said plurality of inserts and said plurality of spacers each include a first material of a first rigidity, and wherein said first flange and said second flange each include a second material of a second rigidity less than said first rigidity.

7. The coupling assembly of claim 6, wherein said first material is sintered bronze.

8. The coupling assembly of claim 6, wherein said second material is glass fiber polypropylene.

9. The coupling assembly of claim 8, wherein said first material is sintered bronze.

10. The coupling assembly of claim 1, wherein each spacer shank portion includes a plurality of teeth circumferentially disposed.

11. The coupling assembly of claim 1, wherein each insert shank portion has a first length, wherein each spacer shank portion has a second length, wherein said first flange has a first width between said first surface of said first flange and said second surface of said first flange, wherein said second flange of said seal plate has a second width between said first surface of said second flange and said second surface of said second flange, and wherein a sum of said first length with said second length is substantially about equal to a sum of said first width with said second width.

12. The coupling assembly of claim 1, including an impeller disposed within said pump housing and an electric motor coupled to said impeller through said seal plate.

13. A coupling assembly for forming a liquid-tight seal in a water pump, comprising:

a pump housing defining an opening and including a first flange formed about a periphery of said opening, said first flange having a first plurality of apertures defined therethrough, and said pump housing being provided with a first sealing surface disposed at a first angle with respect to an inner periphery of said first flange;

a seal plate including a second flange formed about a periphery thereof, said second flange having a second plurality of apertures defined therethrough, and said seal plate being provided with a second sealing surface disposed at a second angle with respect to an inner periphery of said second flange;

a gasket disposed between said first sealing surface and said second sealing surface;

a plurality of inserts each having a threaded boring extending therethrough and each including an insert head portion and an insert shank portion extending from said insert head portion through one of said first plurality of apertures;

a plurality of spacers each having a boring extending therethrough and each including a spacer head portion and a spacer shank portion extending from said spacer head portion through one of said second plurality of apertures to align said boring with said threaded boring; and a plurality of connectors each including a connector head portion abutting said spacer head portion, a connector shank portion extending from said connector head portion, through said boring, and at least partially through said threaded boring, and a plurality of threads formed on said connector shank portion cooperating with said threaded boring to induce a liquid-tight seal between said gasket, said first sealing surface, and said second sealing surface;

wherein each insert shank portion has a first length, wherein each spacer shank portion has a second length, wherein said first flange has a first width, wherein said second flange has a second width, and wherein a sum of said first length with said second length is substantially about equal to a sum of said first width with said second width.

14. The coupling assembly of claim 13, wherein each of said first plurality of apertures has a substantially square-shaped cross section, wherein each insert shank portion has a corresponding substantially square-shaped cross section, wherein each of said second plurality of apertures has a substantially circle-shaped cross section, and wherein each spacer shank portion has a corresponding substantially circle-shaped cross section.

15. The coupling assembly of claim 13, wherein each spacer shank portion includes a plurality of teeth circumferentially disposed.

16. The coupling assembly of claim 13, wherein said plurality of inserts and said plurality of spacers are formed of a first material of a first rigidity, and wherein said first flange and said second flange are formed of a second material of a second rigidity less than said first rigidity.

17. The coupling assembly of claim 16, wherein said first material is sintered bronze.

18. The coupling assembly of claim 17, wherein said second material is glass fiber polypropylene.

19. A coupling assembly for forming a liquid-tight seal in a water pump, comprising:

a pump housing defining an opening and including a first flange formed about a periphery of said opening, said first flange having a first plurality of apertures defined therethrough, and said pump housing being provided with a first sealing surface disposed at a first angle with respect to an inner periphery of said first flange;

a seal plate including a second flange formed about a periphery thereof, said second flange having a second plurality of apertures defined therethrough, and said seal plate being provided with a second sealing surface disposed at a second angle with respect to an inner periphery of said second flange;

a gasket disposed between said first sealing surface and said second sealing surface;

a plurality of inserts each having a threaded boring extending therethrough and each including an insert head portion and an insert shank portion extending from said insert head portion through one of said first plurality of apertures;

a plurality of spacers each having a boring extending therethrough and each including a spacer head portion and a spacer shank portion extending from said spacer head portion through one of said second plurality of apertures to align said boring with said threaded boring; and a plurality of connectors each including a connector head portion abutting said spacer head portion, a connector shank portion extending from said connector head portion, through said boring, and at least partially through said threaded boring, and a plurality of threads formed on said connector shank portion cooperating with said threaded boring to induce a liquid-tight seal formed between said gasket, said first sealing surface, and said second sealing surface;

wherein said plurality of inserts and said plurality of spacers are formed of a first material of a first rigidity, and wherein said seal plate and said pump housing are formed of a second material of a second rigidity less than said first rigidity.

20. The coupling assembly of claim 19, wherein said first angle is about forty-five degrees, and wherein said second angle is about ninety degrees.

* * * * *